United States Patent [19]

Trzecieski

[11] 4,333,953

[45] Jun. 8, 1982

[54] CREAMY MILK ICE CREAM AND PROCESS FOR THE PRODUCTION THEREOF

[75] Inventor: Jan Trzecieski, Naerum, Denmark

[73] Assignee: Kirk Chemicals, Denmark

[21] Appl. No.: 204,804

[22] Filed: Nov. 7, 1980

[30] Foreign Application Priority Data

Nov. 12, 1979 [DK] Denmark .............................. 4780/79

[51] Int. Cl.³ .......................... A23G 9/04; A23G 9/02
[52] U.S. Cl. ........................................ 426/34; 426/41; 426/42; 426/565
[58] Field of Search ................. 426/565, 566, 567, 41, 426/34, 42

[56] References Cited

U.S. PATENT DOCUMENTS

| | | | |
|---|---|---|---|
| 1,414,214 | 4/1922 | Sanna | 426/565 |
| 1,737,101 | 11/1929 | Turnbow | 426/565 |
| 2,465,905 | 3/1949 | Meade et al. | 426/41 |
| 2,681,858 | 6/1954 | Stimpson | 426/41 |
| 2,738,279 | 3/1956 | Stimpson | 426/565 |
| 2,749,242 | 6/1956 | Stimpson | 426/41 |
| 2,826,502 | 3/1958 | Sfortunato et al. | 426/41 |
| 2,826,503 | 3/1958 | Roberts et al. | 426/41 |
| 3,615,662 | 10/1971 | Ellinger et al. | 426/565 |
| 3,852,496 | 12/1974 | Weetall | 426/41 |

*Primary Examiner*—Jeanette M. Hunter

[57] ABSTRACT

A creamy milk ice cream and process for the production of creamy milk ice cream on the basis of fats, a quantity from about 12 to about 15 percent by weight of milk solid non-fat, of which quantity from about 25 to about 35 percentages by weight may be substituted by demineralized whey powder, sugars, stabilizers, emulsifying agents, lactase, optionally aromas and/or coloring matters, and water, by which process the ingredients, except the fats, are mixed and kept at a temperature of from about 30° to about 50° C. for a period from about 1 to about 3 hours, whereafter the fats are added, and the mixture is pasteurized, homogenized, cooled, optionally ripened, and frozen, with addition of aromas and/or coloring matters as desired.

7 Claims, No Drawings

CREAMY MILK ICE CREAM AND PROCESS FOR THE PRODUCTION THEREOF

The present invention relates to a milk ice cream product and to a process for the production of a creamy milk ice cream on the basis of fats, milk solid non-fat, sugars, lactase, stabilizers, emulsifying agents, optionally aromas and/or coloring matters, and water, by which process the ingredients are mixed, and the mixture is pasteurized, homogenized, cooled, optionally ripened, and frozen, with addition of aromas and/or coloring matters, if desired.

It is generally known that ice cream consumers prefer products having an agreeable creamy structure.

The improved freezer construction and cooling performance as well as the general tendency to consume milk ice cream just removed from the freezer, i.e., without any kind of previous warming, has created a demand for milk ice cream, having an agreeable creamy structure at low temperatures, for instance about −20° C.

In order to comply with this demand, ice cream producers have tried to produce a milk ice cream having a creamy structure by using a high content of edible fats and a high content of specially selected stabilizers. An increase of the content of fats is inexpedient both for nutritional and for economic reasons, and by using a high content of edible fats the milk ice cream becomes an ordinary ice cream. By increasing the quantity of stabilizers used the ice cream achieves a puddingy structure.

An apparatus for measuring the creamy structure of ice cream does not exist; the evaluation of this property is made by special tasting panels consisting of well-trained specialists.

Milk ice cream is commonly produced by using the following ingredients:

| Fats | about 2–4% |
| --- | --- |
| MSNF | about 8% |
| Saccharose | about 10–14% |
| Monosaccharides | about 3% |
| Emulsifying/Stabilizing Combination | about 0.5–0.7% |
| Water up to | 100% |

The percentages stated above and below are all calculated on the basis of the total weight of the mixture.

In this context the term fats covers butter fat or vegetable fats.

MSNF stands for milk solid non-fat. Usually, concentrated skimmed milk or skimmed milk powder is used. MSNF mainly contains lactose, casein, globulin and albumin. It is known to replace 10–30% of MSNF by demineralized whey powder. Demineralized whey powder mainly contains lactose, globulin and albumin. This replacement gives a considerable economic gain, but simultaneously it involves a risk of producing a.o. sandy ice cream, i.e., ice cream containing lactose crystals.

It has been proposed to use lactase in the production of milk ice cream in order to avoid the crystallization of lactose in the milk ice cream. By modern methods of production it is however, in practice, possible to avoid this crystallization, and consequently, lactase is not used in the production of milk ice cream.

It was found that a milk ice cream may be produced having a surprisingly good creamy structure corresponding to the creamy structure of ordinary ice cream by using a substantially larger quantity of MSNF than usual, in connection with the addition of lactase.

In accordance herewith the process according to the invention is characterized in that the ingredients, except the edible fats, are mixed, and the mixture is kept at a temperature of from about 30° to about 50° C. for a period of from about 1 to about 3 hours, whereafter the fats are added, and that a quantity of from about 12 to about 15% by weight of milk solid non-fat, calculated on the total weight of the mixture, of which quantity from about 25 to about 35% thereof by weight is replaced by demineralized whey powder.

In accordance with the present invention a milk ice cream can be produced having a very creamy structure, almost not differing from ordinary ice cream having a content of fat of 10% by using for instance:

| Butter or Vegetable Fats | 3% |
| --- | --- |
| Skimmed Milk Powder | 15% |
| Saccharose | 14% |
| Dextrose | 3% |
| Lactase Preparation | 0.3% |
| Emulsifying/Stabilizing Combination | 0.6% |
| Water | 69.1% |

The milk ice cream produced by the process according to the invention does not only have a surprisingly good creamy structure, but has also nutritionally a better composition than the substantially fatter ordinary ice cream with a correspondingly creamy structure. Furthermore, the use of MSNF or demineralized whey powder instead of the more expensive fats offers great economic advantages, and the use of lactase also effects that smaller quantities of sugars may be used since a major part of the lactose is hydrolyzed into glucose and galactose.

By the process according to the invention a quantity of from about 12 to about 15% by weight of MSNF is used, as previously stated, of which quantity from about 25 to about 35% thereof by weight optionally is replaced by demineralized whey powder. The ingredients, except the fats, are mixed, whereafter the mixture is kept suited to enzymatic hydrolysis of lactose, namely at a temperature of from about 30° to about 50° C. for a period of from about 1 to about 3 hours, whereafter the edible fats are added prior to the pasteurization. Pasteurization deactivates the lactase. The remaining process steps i.e., pasteurization, homogenization, cooling, optionally ripening, and freezing are carried out in a manner known per se in the production of milk ice cream, including as heretofore if desired, the addition of aromas and/or coloring matters to flavor the milk ice cream. When, by the process according to the invention, the mixture is kept at a temperature of from about 30° to about 50° C. for a period of from about 1 to about 3 hours prior to the pasteurization, the lactase causes hydrolysis of lactase to glucose and galactase to an extent of at least about 50%, 50 to 70% being preferred.

According to the invention it has been found to be particularly advantageous to use 15% by weight of MSNF, in which way a milk ice cream is achieved, having a particularly good creamy structure.

More generally, the proportions herein contemplated are:

| Fats | about 2-4% |
|---|---|
| MSNF* | 12-15% |
| Saccharose | about 10-14% |
| Monosaccharides | about 3% |
| Emulsifers & Stabilizers | about 0.5-0.7% |
| Water up to | 100% |

*Demineralized whey powder may be substituted for 25-35% of the MSNF.

The process according to the invention is further illustrated in the following Examples, in which all percentages are percentages by weight calculated on the ready mixture.

EXAMPLE 1

A. A mixture was prepared of the following ingredients:

| Skimmed Milk Powder | 600 g |
|---|---|
| Saccharose | 560 g |
| Dextrose | 120 g |
| Lactase Preparation (Lactozym ® 750 L) | 12 g |
| Emulsifying/Stabilizing Combination ("PANISOL" PI SUPER) | 24 g |
| Water | 2564 g |

The mixture was kept at a temperature of about 40° C. for about 2 hours with slow stirring, heated to about 50° C., 120 g of butter (water content 16%) was added, heated to about 70° C. and homogenized in a one-stage homogenizer at a pressure of about 230 kg/cm². The homogenized mixture was cooled to about 4° C. and kept at this temperature for about 6 hours. Then the mixture was frozen at about −4° C., whereafter it was hardened at about −20° to −30° C.

A milk ice cream was achieved, the creamy structure of which was estimated by a well-trained tasting panel. A marking scale from 1 to 5 was used, according to which 5 covered the desired creamy structure found in ordinary ice cream. The milk ice cream achieved got the mark 5+, where + indicates an upward direction.

When using the above described process, however, replacing the butter by a corresponding quantity of vegetable fats (soya/coconut oil hardened to 42° C.) and by using a homogenizing pressure of 210 kg/cm², an ice cream was achieved, which after the judgment of the tasting panel got the mark 5+.

B. When using the above described process, however, instead of 600 g of skimmed milk powder using a mixture of 400 g of skimmed milk powder and 200 g of demineralized whey powder, both with butter and with vegetable fats ice creams were produced, which by the tasting panel both got the mark 5. The milk ice creams produced were a little softer than the milk ice creams produced according to A.

COMPARATIVE EXAMPLE 1

A mixture was prepared of the following ingredients:

| Butter (water content 16%) | 120 g |
|---|---|
| Skimmed Milk Powder | 600 g |
| Saccharose | 560 g |
| Dextrose | 120 g |
| Emulsifying/Stabilizing Combination ("PANISOL" PI SUPER) | 24 g |
| Water | 2576 g |

The mixture was heated to a temperature of about 70° C. and homogenized in a one-stage homogenizer at a pressure of about 230 kg/cm². The homogenized mixture was cooled to about 4° C. and kept at this temperature for about 6 hours. Then the mixture was frozen at about −4° C., whereafter it was hardened at about −20° to about −30° C.

A milk ice cream was produced, which by the tasting panel got the mark 1, which means that is was very sandy.

When using the above described process, however, instead of butter using a corresponding quantity of vegetable fats (soya/coconut oil hardened at 42° C.) and using a homogenizing pressure of 210 kg/cm², an ice cream was achieved, which by the tasting panel got the mark 1, which means that it had a very sandy structure.

EXAMPLE 2

A. A mixture was prepared of the following ingredients:

| Skimmed Milk Powder | 480 g |
|---|---|
| Saccharose | 560 g |
| Dextrose | 120 g |
| Lactase Preparation ("Lactozym" ® 750 L) | 12 g |
| Emulsifying/Stabilizing Combination ("PANISOL" PI SUPER) | 24 g |
| Water | 2684 g |

The mixture was kept at a temperature of about 40° C. for about 2 hours with slow stirring, heated to about 50° C., 120 g of butter (water content 16%) was added, the mixture was heated to about 70° C. and homogenized in a one-stage homogenizer at a pressure of about 230 kg/cm². The homogenized mixture was cooled to about 4° C. and kept at this temperature for about 6 hours. Then the mixture was frozen at about −4° C., whereafter it was hardened at about −20° to −30° C.

A milk ice cream was produced, the creamy structure of which was estimated by a trained testing panel. A marking scale from 1 to 5 was used, according to which 5 covered the desired creamy structure found in ordinary ice cream. The milk ice cream achieved got the mark 4+, where + indicates an upward direction.

When using the above described process, however, instead of butter using a corresponding quantity of vegetable fats (soya/coconut oil hardened to 42° C.) and by using a homogenizing pressure of 210 kg/cm² a milk ice cream was achieved, which by the tasting panel got the mark 4+.

B. When using the above described process, however, instead of 480 g of skimmed milk powder using a mixture of 320 g of skimmed milk powder and 160 g of demineralized whey powder, both with butter and with vegetable fats a milk ice cream was achieved, which by the tasting panel got the mark 4+. The milk ice cream achieved was a little softer than the milk ice creams achieved above under A.

COMPARATIVE EXAMPLE 2

A mixture was prepared of the following ingredients:

| | |
|---|---|
| Butter (water content 16%) | 120 g |
| Skimmed Milk Powder | 480 g |
| Saccharose | 560 g |
| Dextrose | 120 g |
| Emulsifying/Stabilizing Combination ("PANISOL" PI SUPER) | 24 g |
| Water | 2684 g |

The mixture was heated to a temperature of about 70° C. and homogenized in a one-stage homogenizer at a pressure of about 230 kg/cm$^2$. The homogenized mixture was cooled to about 4° C. and kept at this temperature for about 6 hours. Then the mixture was frozen at about −4° C., whereafter it was hardened to about −20° to −30° C.

A milk ice cream was achieved, which by the tasting panel got the mark 2, which means that it was rather sandy.

When using the above described process, however, instead of butter using a corresponding quantity of vegetable fats (soya/coconut oil hardened to 42° C.) and by using a homogenized pressure of 210 kg/cm$^2$, a milk ice cream was achieved, which by the tasting panel got the mark 2, which means that it had a rather sandy structure.

I claim:

1. A process for the production of creamy milk ice cream which per 100 parts by weight of the mlik ice cream comprises mixing 12–15 parts of milk solid non fat with lactase, sugars, stabilizer, emulsifier and water, then holding the resulting mixture under conditions suited to enzymatic hydrolysis of lactose until at least about 50% of the lactose in the mixture has been hydrolyzed, thereafter adding 2–4 parts of edible fat the lactase, sugars, stabilizer, emulsifier and water being the balance by weight of said hundred parts, then pasteurizing, followed by homogenizing and subsequently freezing, followed by hardening.

2. The process of claim 1 wherein said mixture is held at 30°–50° C. for 1–3 hours.

3. The process of claim 2 wherein the mixture is held at 40° C. for about 2 hours.

4. The process of claim 1 wherein the milk solid non fat contains 15% by weight of the total milk ice composition.

5. The process of claim 1 wherein from 25–35% by weight of the mlik solid non fat is replaced by demineralized whey powder.

6. A creamy milk ice cream comprising edible fat, sugars, milk solid non fat, deactivated lactase, stabilizers, emulsifying agents and water, the fat content being about 2–4% by weight, the milk solid non fat being about 12–15% the balance being the deactivated lactase, stabilizers, emulsifying agents and water, and at least 50% of the lactose content of the milk solid non fat being hydroyzed.

7. A creamy milk ice cream comprising 2–4% edible fat by weight, sugars, deactivated lactase, stabilizers, emulsifying agents, water and 12–15% by weight of a mixture of milk solid non fat and demineralized whey in weight proportions of 75:25 to 65:35 the balance being the deactivated lactase, stabilizers, emulsifying agents and water, with at least 50% of the lactose content originally present in the whey and milk solid non fat being hydrolyzed.

* * * * *